March 15, 1932. I. LANGMUIR 1,849,842
SIGNALING DEVICE
Filed April 5, 1930
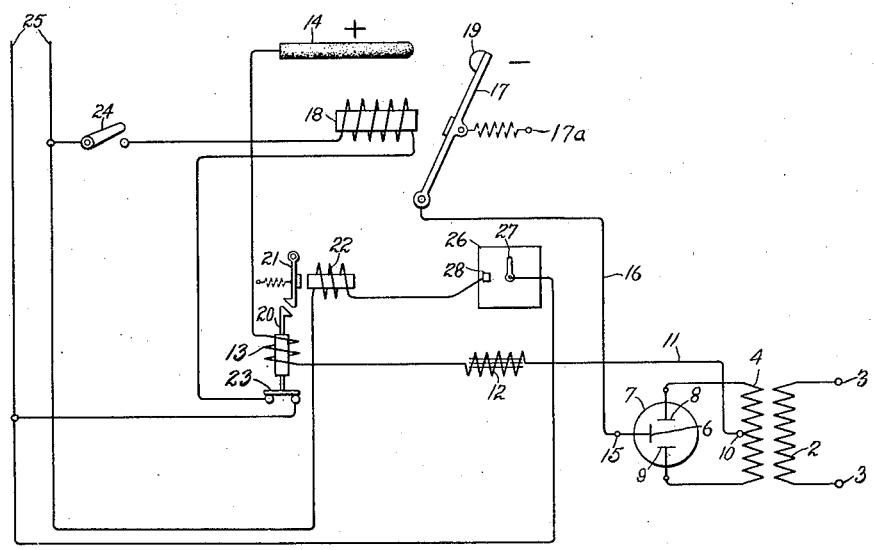
Inventor:
Irving Langmuir,
by Charles E. Tullar
His Attorney.

Patented Mar. 15, 1932

1,849,842

UNITED STATES PATENT OFFICE

IRVING LANGMUIR, OF SCHENECTADY, NEW YORK, ASSIGNOR TO GENERAL ELECTRIC COMPANY, A CORPORATION OF NEW YORK

SIGNALING DEVICE

Application filed April 5, 1930. Serial No. 441,983.

My invention relates to electric flashing devices. I have found that flashing devices such as I propose are more effective in guiding airplanes to their landing fields or along their routes, in murky or foggy weather, than other types of signals, such as the ordinary rotating beacon.

In connection with my invention I contemplate providing together with a pair of electrodes serving as the terminals of a circuit, means for periodically bringing the electrodes together to close the circuit and for thereafter separating them to produce flashes periodically. It is also an object to provide in this circuit a reactance coil and an electromagnet in series, the former for restricting the rate of rise of current in the circuit when it is closed and also for prolonging the flash and the latter for operating a mechanism to break both the circuit and the arc formed after the break.

As a source of current for the flasher a storage battery may be used or instead a motor generator set may be used where the main source of power is an alternating current line. In such a case it is preferable that a flywheel should be attached to the motor generator set, the object of the flywheel being to modify the effect on the power line of the closure of the electrodes preceding the flash. In place of a motor generator, however, a rectifier may be used such as a mercury pool full wave rectifier.

The nature and scope of the invention will be better understood from the following specification and claims, reference being had to the accompanying drawing for a specific illustration of the application of the invention. It will be understood however that I do not restrict the invention to the particular form of apparatus and circuit shown and described but contemplate variations and modifications as indicated by the scope of the claims contained herein.

Referring more in detail to the drawing which shows the apparatus of the invention in diagrammatic form, the primary winding 2 of a transformer is connected to any suitable source of alternating current such as an ordinary alternating current power line represented by the terminals 3. The secondary winding 4 of the transformer is connected with the plates 8 and 9 of a rectifier 7 preferably of the so-called mercury pool type. The winding 4 is provided with a mid-terminal 10 from which a conductor 11 leads to a reactance coil 12 and through the reactance coil to an electromagnet or electro-responsive switching means 13 terminating finally in the positive electrode 14 of the flasher. The third terminal 15 of plate 6 or mercury pool of the rectifier is connected with conductor 16 which latter leads to an armature 17 of an electromagnet 18 on the end of which armature the negative electrode 19 is located. At least one of the electrodes, in the present instance the negative electrode, is mounted for movement relative to the other electrode such a distance that an arc formed between them is broken. In the present instance I have indicated armature 17 as being biased to its open circuit position by the provision of a biasing means or spring 17a. The armature 17 is so placed that when the electromagnet 18 is energized the electrodes 14 and 19 are brought into contact and the circuit closed through the reactance coil 12 and through the solenoid magnet 13. The reactance coil 12 is inserted in the circuit to serve as an energy storing means and for restricting the rate of rise of current thereby avoiding any undesirable fluctuations of voltage in the line 3. The reactance coil also functions to prolong and intensify the arc.

Associated with the core 20 of the solenoid 13 is a latch 21 under the control of an electromagnet 22. When the current in the circuit of the electrodes 14 and 19 reaches a predetermined amount, as for example 200 amperes, the core 20 of the solenoid is raised, due to the action of the operating coil of the electro-responsive switching means 13 in the main circuit. After the core is raised it is caught and held by the latch 21 in the raised position. The solenoid 13 controls a switch 23 which, when the solenoid is energized, is opened, thereby breaking the auxiliary circuit through the electromagnet 18 which as indicated controls the electrode 19.

In series with the electromagnet 18 I provide a switch 24 which is adapted to be closed for energizing the magnet 18, current being supplied for this purpose from any suitable source of current such as the line 25. This source of current may for example be an ordinary 110 volt alternating current light and power line. Therefore, by closing the switch 24 the electromagnet 18 is energized thereby bringing together the electrodes 14 and 19, thus closing a circuit with the electrodes, the choke coils 12 and the solenoid 13 in series. When this solenoid energizes it attracts its armature 20 which becomes latched in its raised position, as described, thereby breaking the circuit of the magnet 18. As a result the electrode 19 falls back, forming an arc between the electrodes 19 and 14 and then causing the rupture of the arc. When the series circuit is broken the voltage produced in the coil 12 is added to that of the rectifier and the energy stored in the circuit is dissipated at the arc at the time of the flash.

The electromagnet 22, as indicated, is controlled by an automatically operated circuit interrupter 26 which periodically closes the circuit for the magnet 22 each time that the arm 27 engages the contact 28. The energization of the magnet 22 unlatches the core 20 of the solenoid 13, permitting this core to fall back, thus closing again the circuit through the magnet 18. This magnet upon becoming energized again brings the electrodes together, thereby again initiating the cycle of operations previously described. Electromagnets 18 and 22 and interrupter 26 form a means for periodically moving electrode 19 into engagement with electrode 14 and holding it in such engagement until released by action of electromagnet 13. With such apparatus therefore arc flashes may be periodically produced between the electrodes 14 and 19. These flashes may be produced at suitable periods as for example at periods of from three to five seconds which however may be varied by varying the rate of operation of the device 26. Also by varying the size of the reactance coil 12 the amount of energy that becomes available for the flash may be varied. The solenoid 13 may be set so that the flash does not take place until the flow of current through the electrodes reaches, as already indicated, 200 amperes, which value of current may be reached at the end of an interval of two-tenths of a second if so desired, depending upon the character of the reactance coil 12. The voltage produced when the electrodes are separated is affected by the character of the reactance coil 12. Therefore, the character of the arc can be varied by varying the reactance coil.

With a device of this sort it is possible with a choke coil of about one henry to obtain approximately 2500 candle seconds which may be dissipated in one-tenth of a second. This means an instantaneous candle power of about 25,000 maintained over a period of one-tenth of a second; for obtaining this result the electrode 14 may be, for example, a rod or wire of iron or steel about $\frac{1}{16}''$ in diameter. The terminal 19 may also be a rod of iron or steel, but I prefer to have it in the form of a block of iron. Electrodes of other material, however, may be used. In as much as the flashing operation gradually consumes the electrode 14 this electrode may be mounted on any suitable feeding mechanism in order to maintain the end of electrode 14 approximately in a constant position with reference to the electrode 19.

When a storage battery or a very large motor generator set is used the function of the reactance coil 12 as a means for delaying the rate of rise of the current in the circuit is not so important but it has another function, namely, that of prolonging the arc and of thus making it more effective which renders the coil important at all times.

With a flashing device of the above character the light source is not directed in any particular direction, but spreads in all directions and is found to be more effective than when restricted to beam form.

What I claim as new and desire to secure by Letters Patent of the United States, is:

1. In a signaling device, a pair of electrodes, means mounting at least one of said electrodes for movement relative to the other such a distance that an arc formed between them may be broken, means biasing said means to cause such movement, a circuit for supplying current to said electrodes, an electro-responsive switching means having an operating portion in said circuit and contacts separated on the passage of a predetermined current through said operating portion and latch means for holding the contacts separated, an electro-magnet cooperating with said mounting means to move said electrodes into contact, a secondary circuit including said magnet and the contacts of the electro-responsive switching means, and means for tripping said latch means to permit the closure of the secondary circuit.

2. In a signaling device, a pair of electrodes, means mounting at least one of said electrodes for movement relative to the other such a distance that an arc formed between them may be broken, means biasing said means to cause such movement, a circuit for supplying current to said electrodes, an electro-responsive switching means having an operating portion in said circuit and contacts separated on the passage of a predetermined current through said operating portion and latch means for holding the contacts separated, an electro-magnet cooperating with said mounting means to move said electrodes into contact, a secondary circuit including said magnet and the contacts of the electro-responsive switching means, and means for periodically tripping said latch means to permit the closure of the secondary circuit.

3. In a signaling device, a pair of electrodes, means mounting at least one of said electrodes for movement relative to the other such a distance that an arc formed between them may be broken, means biasing said means to cause such movement, a circuit for supplying current to said electrodes, means for periodically moving one electrode into engagement with the other and for holding it in such engagement, electromagnetic means including a magnet in the electrode circuit for rendering said holding means inoperative on the passage of a predetermined amount of current, and energy storage means connected in said circuit to increase the intensity and duration of the arc upon the separation of the electrodes.

4. In a signaling device, a pair of electrodes, a pivoted arm mounting one of said electrodes for movement relative to the other such a distance that an arc formed between them may be broken, a spring biasing said arm to cause such movement, a circuit for supplying current to said electrodes, means for periodically moving one electrode into engagement with the other and for holding it in such engagement, electromagnetic means including a magnet in the electrode circuit for rendering said holding means inoperative on the increase of the current to a predetermined value, and a choke coil connected in said circuit to increase the intensity and duration of the arc upon the separation of the electrodes.

In witness whereof I have hereunto set my hand this 4th day of April, 1930.

IRVING LANGMUIR.